United States Patent

[11] 3,569,742

[72] Inventor George F. Schroeder
West Wayne, N.J.
[21] Appl. No. 754,841
[22] Filed Aug. 23, 1968
[45] Patented Mar. 9, 1971
[73] Assignee General Precision Systems Incorporated
Little Falls, N.J.

[54] TRANSISTOR SWITCHING CIRCUIT
6 Claims, 2 Drawing Figs.

[52] U.S. Cl. .......... 307/254, 307/246, 307/300, 307/253
[51] Int. Cl. .......... H03k 17/60
[50] Field of Search .......... 307/246, 254, 280, 300, 319

[56] References Cited
UNITED STATES PATENTS

| | | | |
|---|---|---|---|
| 3,091,705 | 5/1963 | Levine | 307/300X |
| 3,149,239 | 9/1964 | Weygaug | 307/254 |
| 3,160,765 | 12/1964 | Krossa | 307/300X |
| 3,194,979 | 7/1965 | Toy | 307/254X |

*Primary Examiner*—Donald D. Forrer
*Assistant Examiner*—R. C. Woodbridge
*Attorneys*—S. A. Giarratana, G. B. Oujevolk and S. M. Bender

ABSTRACT: A transistor switching circuit having a capacitor connected between a switching transistor and an input. A second transistor is provided to connect the capacitor to discharge in the reverse direction through the emitter base junction of the switching transistor to decrease its turning off time.

INVENTOR
GEORGE F. SCHROEDER

BY [signature]
ATTORNEY

TRANSISTOR SWITCHING CIRCUIT

BACKGROUND OF THE INVENTION

This invention relates to a switching circuit, and more particularly, to such a circuit for decreasing the turnoff time of a switching transistor.

The need for decreasing the turnoff time of a switching transistor in high power amplifier circuits and the like has generally been recognized. For example, it has been proposed to provide a capacitor connected in the circuit between the input source and the switching transistor. When the transistor is turned off, the capacitor is discharged into the base-emitter circuit of the switching transistor to decrease its turnoff time. A relatively high resistance is connected in the discharge path to prevent the capacitor from being shunted during its charging cycle. However, this resistance becomes the dominant impedance in the discharge path thus limiting the decrease in the turnoff time of the transistor.

SUMMARY OF THE INVENTION

It is therefore an object of the present invention to provide a transistor switching circuit which effects the turning off of one or more switching transistors in a shorter time than the circuits of the prior art.

Briefly summarized, the switching circuit of the present invention features the use of a capacitor connected between an input and a switching transistor and being adapted to charge in response to a first input signal and discharge in response to a second input signal. A second transistor is provided which connects the capacitor to discharge in a reverse direction through the emitter base junction of the switching transistor to decrease its turning-off time.

BRIEF DESCRIPTION OF THE DRAWINGS

Reference is now made to the accompanying drawings for a better understanding of the nature and objects of the switching circuit of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
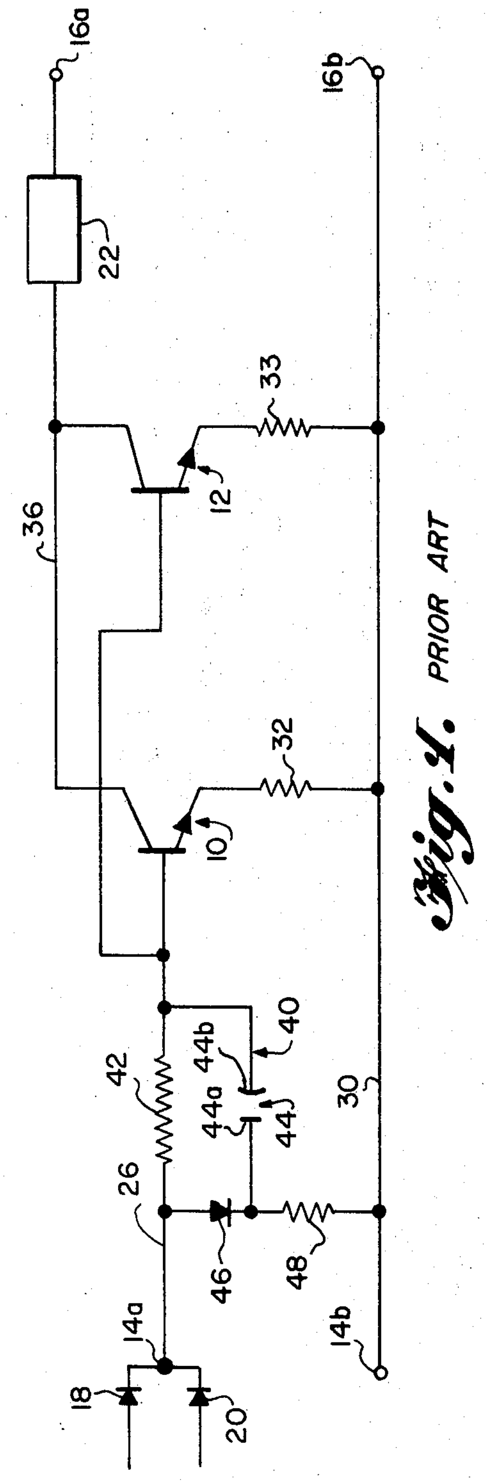
Fig. 1. PRIOR ART
FIG. 1 is a circuit diagram of a prior art arrangement.

Referring specifically to FIG. 1, which shows the prior art arrangement mentioned above, the reference numerals 10 and 12 refer to a pair of switching transistors connected in parallel to control the application of power connected between terminals 16*a* and 16*b* to a load 22. The switching of the transistors 10 and 12 is controlled by the signal applied between input terminals 14*a* and 14*b*. Pulses may be applied to the terminal 14*a* through a diode 18 or a diode 20 to control the switching of the transistors 10 and 12. The terminal 14*a* is connected to the bases of the transistors 10 and 12 through a conductor 26 and a circuit designed generally by the reference number 40. The terminal 14*b* is connected to the power terminal 16*b* by a conductor 30, which is connected to the emitter of the transistors 10 and 12 by a pair of balancing resistors 32 and 33 respectively. The collectors of the transistors 10 and 12 are connected together by a conductor 36 and to the power terminal 16*a* through the load 22. The positive side of a DC power source is connected to terminal 16*a* and the negative side of this source is connected to terminal 16*b*.

As discussed above, this prior art arrangement provides a means for decreasing the turning-off time of the switching transistors 10 and 12 which means is in the form of the circuit 40. Specifically, this circuit comprises a resistor 42 connected in series between the input terminal 14*a* and the bases of the transistors 10 and 12, a series circuit of a capacitor 44 and a diode 46 connected in parallel with the resistor 42, and a resistor 48 connected between the conductor 30 and the junction between the capacitor 44 and the diode 46.

In the operation of the prior art device of FIG. 1, a positive voltage pulse is received through one of the diodes 18 and 20, which pulse turns on the transistors 10 and 12 in addition to charging the capacitor 44 through diode 46 to make the plate 44*a* thereof positive with respect to the plate 44*b*.

When the input pulse terminates to initiate the turning off of the transistors 10 and 12 the charge on capacitor 44 backbiases the diode 46 and a discharge current flows through the resistor 48, line 30, resistors 32 and 33, and into the emitter and out of the bases of the transistors 10 and 12, which current flows until the space charge in the transistors 10 and 12 is completely swept out, thus speeding the turning off of these transistors.

However, since the balancing resistors 32 and 33 of the transistors 10 and 12, respectively, are relatively small in value, the current flowing into the base of the transistors 10 and 12 via line 30 is limited essentially by the resistor 48, and the latter must be sufficiently high so that it does not shunt the capacitor 44 during its charging cycle, and thereby rob it of the available current from the driving source. This resistance is therefore the dominant impedance in the turnoff circuit and provides a large impedance to the flow of current from the capacitor 44 as the latter discharges. As a result, most of the capacitor energy represented by the charge stored on the capacitor is dissipated in the resistor 48 and is not utilized to sweep the space charge out of the transistors 10 and 12. As a result, the turnoff time of the transistor is not as short as it might otherwise be.

Figure 2:
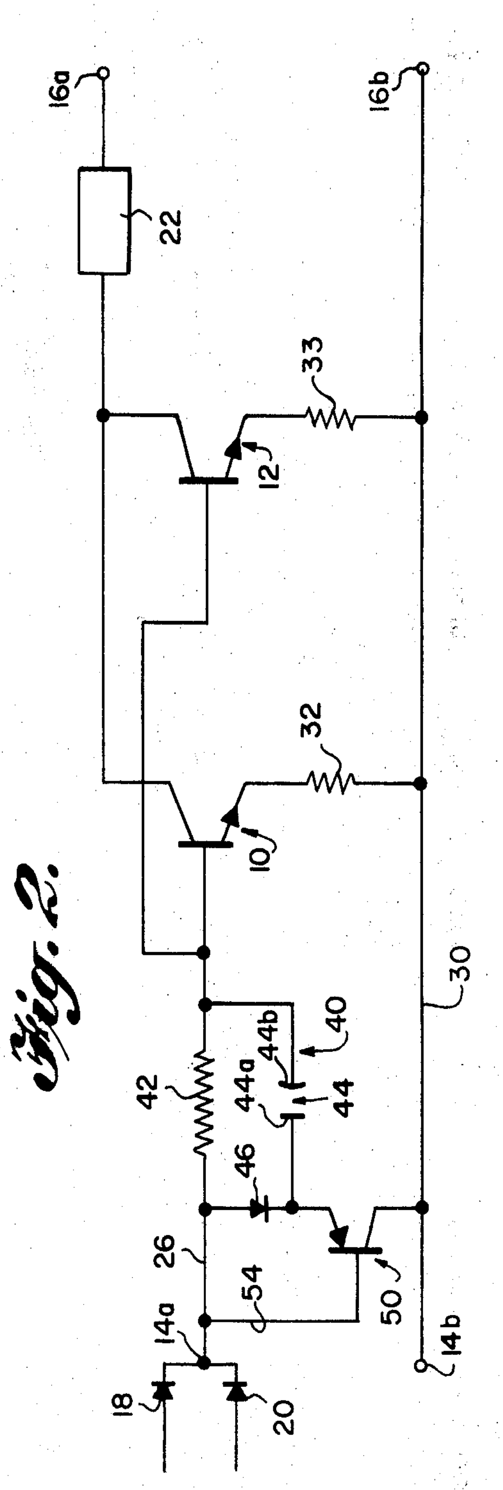
FIG. 2 is a circuit diagram depicting the arrangement of the present invention.

The circuit of the present invention represented in FIG. 2 eliminates most of the dissipation of the capacitor energy external to the transistors 10 and 12 thus greatly reducing the transistor turnoff time. The circuit is similar to that of FIG. 1 and therefore the same reference numerals refer to similar components. However, in the circuit of FIG. 2, the resistor 48 has been replaced by a transistor 50 having its base connected via a conductor 54 to terminal 14*a*, its emitter connected to the plate 44*a* of the capacitor and its collector connected to the conductor 30.

In the operation of the device of the present invention, when the positive input pulse from one of diodes 18 and 20 occurs, the voltage drop through the diode 46 is sufficient to keep the transistor 50 turned off so that all the available current passes to the capacitor 44 and through the resistor 42, and ultimately into the bases of the switching transistors 10 and 12, thus assuring a maximum turnon current. While the input pulse is being applied, the capacitor 44 will charge making the plate 44*a* positive with respect to the plate 44*b*. When the input pulse terminates, the charge on the capacitor 44 causes current to flow out of the base of the transistor 50, thus turning on the latter and causing it to saturate. The capacitor 44 will then discharge through the transistor 50 and through the emitter-base junction of the transistors 10 and 12 in the reverse direction to sweep the space charge out of these transistors and switch them off. The low saturated impedance of the transistor 50 will be in series with the emitter-base junctions of the transistors 10 and 12 in the discharge path of the capacitor 44 so that most of the capacitor energy is expended in sweeping out the space charge in the transistors 10 and 12, thus achieving a turnoff time much shorter than that achieved by the circuit of FIG. 1.

It has been determined that a test circuit similar to that of FIG. 1 required 10 microseconds to turn off the transistors 10 and 12, whereas in the circuit of the present invention of FIG. 2, the turn off was effected in approximately 1 microsecond. The resulting higher speed turn off greatly reduces the power dissipated in the transistors 10 and 12. In addition to the high speed turn off, the circuit of the present invention permits the available current from the input pulse to be delivered directly to the switching transistors 10 and 12 without any of the current being shunted, thus increasing the efficiency of the turnon cycle.

Although two switching transistors were employed in the above-described embodiment, any number can be used without departing from the scope of the invention. If desired, a relatively small resistor can be added in series with the transistor 50 to limit the current flowing therethrough when it is turned on. Other variations of the specific construction and arrangement of the switching circuit disclosed above can be made by those skilled in the art without departing from the invention as defined in the appended claims.

I claim:

1. In an electrical circuit having at least one switching transistor connected to an input in a manner so that said switching transistor is turned on in response to a first input signal applied to said input and is turned off in response to a second input signal applied to said input and biasing means for applying a reverse bias across the emitter-base junction of said switching transistor, the improvement comprising switch means including a control electrode connected to said input to be driven thereby connected in the circuit between said biasing means and said switching transistor to prevent said reverse bias from being applied to said switching transistor when said first input signal is applied to said input and closing the circuit between said biasing means and said switching transistor to apply said reverse bias to said emitter-base junction when said second signal is applied to said input and unilaterally conducting means connected between said input and the junction between said biasing means and said switch means permitting current flow between said input and said junction only in one direction.

2. The improvement of claim 1 wherein said switch means is in the form of a second transistor.

3. The improvement as recited in claim 1 wherein said biasing means includes a capacitor, and wherein said unilaterally conducting means includes a diode connected in circuit with said capacitor to charge said capacitor while said first signal is applied to said input, and wherein said switch means and said diode cause said capacitor to discharge through said emitter-base junction of said switching transistor when said second signal is applied to said input.

4. The improvement as recited in claim 3 wherein said switch means comprises a second transistor.

5. The improvement as recited in claim 4 wherein said capacitor is connected between said input and said switching transistor and wherein the emitter and collector of said second transistor are connected in series with said capacitor across the emitter-base junction of said switching transistor, and wherein the base of said second transistor is connected to said input.

6. The improvement as recited in claim 1 wherein said biasing means comprises an impedance connected between said input and the emitter-base junction of said switching transistor and a capacitor connected across said impedance, and wherein said unilaterally conducting means includes a diode in circuit with said impedance, said capacitor and said input, and wherein said switch means comprises a second transistor having its emitter connected to the junction between said diode and said capacitor, having its base connected to said input and having its collector connected to the emitter-base junction of said switching transistor.

PO-1050
(5/69)

UNITED STATES PATENT OFFICE
CERTIFICATE OF CORRECTION

Patent No. 3,569,742 Dated March 9, 1971

Inventor(s) George F. Schroeder

It is certified that error appears in the above-identified paten and that said Letters Patent are hereby corrected as shown below:

Change Title Page item [73] ASSIGNEE from "General Precision Systems Incorporated"

to --Singer-General Precision, Inc.--.

Signed and sealed this 17th day of August 1971.

(SEAL)
Attest:

EDWARD M.FLETCHER,JR.
Attesting Officer

WILLIAM E. SCHUYLER,
Commissioner of Paten